(12) United States Patent
Zhang et al.

(10) Patent No.: US 11,624,678 B1
(45) Date of Patent: Apr. 11, 2023

(54) TANK WAVE-CURRENT GENERATION SYSTEM WITH REAR-MOUNTED OUTLET

(71) Applicant: Fishery Engineering Research Institute, Chinese Academy Of Fishery Sciences, Beijing (CN)

(72) Inventors: Xi Zhang, Beijing (CN); Riming Zhao, Nanjing (CN)

(73) Assignee: Fishery Engineering Research Institute, Chinese Academy Of Fishery Sciences, Beijing (CN)

( * ) Notice: Subject to any disclaimer, the term of this patent is extended or adjusted under 35 U.S.C. 154(b) by 0 days.

(21) Appl. No.: 17/857,755

(22) Filed: Jul. 5, 2022

(30) Foreign Application Priority Data

Oct. 18, 2021  (CN) .......................... 202111210549.X

(51) Int. Cl.
    *G01M 10/00* (2006.01)
    *F03B 13/14* (2006.01)
    *E04H 4/00* (2006.01)

(52) U.S. Cl.
    CPC .......... *G01M 10/00* (2013.01); *E04H 4/0006* (2013.01); *F03B 13/14* (2013.01); *F03B 13/142* (2013.01)

(58) Field of Classification Search
    CPC ....... F03B 13/142; F03B 13/14; G01M 10/00; E04H 4/0006
    See application file for complete search history.

(56) References Cited

FOREIGN PATENT DOCUMENTS

| | | | | | |
|---|---|---|---|---|---|
| CN | 101710464 | A | * | 5/2010 | |
| CN | 101710464 | A | | 5/2010 | |
| CN | 103344411 | A | | 10/2013 | |
| CN | 205538155 | U | * | 8/2016 | |
| CN | 205538155 | U | | 8/2016 | |
| CN | 106842999 | A | | 6/2017 | |
| CN | 108362471 | A | * | 8/2018 | ............ G01M 10/00 |
| CN | 109580168 | A | | 4/2019 | |
| CN | 113092061 | A | | 7/2021 | |
| CN | 113418677 | A | * | 9/2021 | ............ G01M 10/00 |
| WO | 2018166149 | A1 | | 9/2018 | |

* cited by examiner

*Primary Examiner* — Herbert K Roberts
*Assistant Examiner* — Anthony W Megna Fuentes

(57) ABSTRACT

Provided is a tank wave-current generation system with a rear-mounted outlet. The rear-mounted outlet and a rectifying device located below a tank are arranged, the rectifying device comprises a rectifying chamber and a built-in rectifying grid, one end of the rectifying chamber is communicated with a water collection tank, and the other end of the rectifying chamber is communicated with a bottom wall of a tank unit, an outlet in the bottom wall is located at a front end of a wave pushing direction of a wave generator, a current subjected to preliminary energy dissipation in the water collection tank is rectified into a smooth fluid through the rectifying grid and then a steady current is input into the tank, so that the current pushed by a wave pushing plate arranged on the wave generator is a steady current meeting a test requirement.

8 Claims, 2 Drawing Sheets

TANK WAVE-CURRENT GENERATION SYSTEM WITH REAR-MOUNTED OUTLET

CROSS REFERENCE TO RELATED APPLICATIONS

This application claims foreign priority of Chinese Patent Application No. 202111210549.X, filed on Oct. 18, 2021 in the China National Intellectual Property Administration, the disclosures of all of which are hereby incorporated by reference.

TECHNICAL FIELD

The present invention relates to the technical field of hydraulic model tests, and more particularly, to a tank wave-current generation system with a rear-mounted outlet.

BACKGROUND

The simulated generation of a wave and a current is an important means of hydraulic and port engineering tests. In marine and coastal engineering, tests such as a fishing port fish shelter, a seawall section, and sediment start and transport must all be performed under action powers generated by the wave and the current. Therefore, a wave generation system and a current generation system are both needed in a tank model test of the above engineering, and in most cases, a wave-current interaction is needed.

In a wave-current tank, a working condition of a test structure under the wave-current action is simulated by a method of mounting a wave generator and a current generation pump at a tail end of the tank. In a traditional tank wave-current generation system, in order to avoid a blocking effect of a wave pushing plate on a current, a water inlet pipe is usually directly mounted at a front end of a wave pushing direction of the wave pushing plate, which is namely a front-mounted outlet. However, there are the following defects: since the water inlet pipe is directly mounted in front of the wave pushing plate, an output current enters the square tank in a vortex shape and then needs to pass through a long transition section to be stabilized, which means that the tank itself needs to be long enough to meet the test requirement. Since the output current from the outlet is in a vortex shape, the current may destroy a shape of the wave when the wave-current interaction is needed, which means that the wave and the current cannot be generated simultaneously. A tail end of the tank has a length of about 4 m to 6 m, so that the tank cannot be used in the transition section of the current, which violates an infinite length use principle of linear tank current generation.

SUMMARY

The present invention aims to overcome the above defects, and provide a tank wave-current generation system with a rear-mounted outlet. The rear-mounted outlet is arranged, which means that a water inlet device is connected with an end part of a tank unit and located at a rear end of an opposite wave pushing direction of a wave generator, and a rectifying device located below a tank is arranged, the rectifying device comprises a rectifying chamber and a built-in rectifying grid, one end of the rectifying chamber is communicated with a water collection tank, and the other end of the rectifying chamber is communicated with a bottom wall of the tank, an outlet in the bottom wall is located at a front end of a wave pushing direction of the wave generator, a current subjected to preliminary energy dissipation in the water collection tank is rectified into a smooth fluid through the rectifying grid and then enters the tank, so that the current pushed by a wave pushing plate arranged on the wave generator is a steady current meeting a test requirement; and a water inlet amount of a water inlet and a wave pushing speed of the wave pushing plate are intelligently controlled through a computer, so that not only a technical problem that the current needs to be stabilized through a long transition section after entering the tank due to the fact that the current is in a vortex shape in the case that a water inlet pipeline is mounted in front of the wave pushing plate is thoroughly solved, and an infinite length use principle of linear tank current generation is met, but also test requirements of current generation and wave generation are met.

The specific technical solution provided by the present invention is as follows.

A tank wave-current generation system with a rear-mounted outlet comprises:

a tank device which comprises a tank unit for bearing a test water body;

a wave generation device which comprises a wave generator mounted at an end part of the tank unit to generate a wave according to a preset instruction;

a water inlet device connected with the end part of the tank unit, used for synchronously controlling a water inlet amount flowing into the tank unit according to a preset flow tide level curve change instruction, and comprising a water collection tank provided with an energy dissipation unit;

a rectifying device used for rectifying a current subjected to preliminary energy dissipation in the water collection tank into a smooth fluid and then transmitting the smooth fluid into the tank unit at a front end of a wave pushing direction of the wave generator, and comprising a rectifying chamber which is located below the tank unit, has one end communicated with the water collection tank and the other end communicated with the tank unit at the front end of the wave generator, and contains a rectifying grid;

a driving device for driving the wave generator and the water inlet device to execute corresponding actions respectively according to instructions, and comprising a driving motor; and a control device for controlling the driving device to execute the instructions according to a preset program and information obtained in real time, and comprising a computer.

Preferably, the tank unit comprises the tank and supporting frames uniformly arranged around the tank along a current direction with a supporting function, and a side wall of the tank between adjacent supporting frames is a transparent wall.

Further, the wave generator comprises a wave generation motor and the wave pushing plate controlled by the wave generation motor for wave generation, a motion sensor is fixedly mounted on the wave pushing plate, and the wave generation motor and the motion sensor are both connected with the computer.

Preferably, the water inlet device further comprises a water inlet pipe connected with a water inlet motor, a flow meter for transmitting flow information to the computer in real time is mounted on the water inlet pipe, and the computer controls the water inlet motor in real time according to the preset program and the flow information.

Further, an outlet of the water inlet pipe extends to a position close to the bottom part of the water collection tank, an energy dissipation net arranged in the energy dissipation unit is mounted at an upper half part of the water collection tank, and a height of the energy dissipation net is equal to that of the side wall of the tank.

Preferably, the rectifying grid is horizontally arranged in the rectifying chamber, so that a turbulent current in the water collection tank is subjected to secondary energy dissipation through a rectifying channel of the rectifying grid and then a steady current is input into the tank.

Further, the rectifying chamber is communicated with the water collection tank and the bottom wall of the tank to form a downwardly inclined chamber, a horizontal chamber and an upwardly inclined chamber. The downwardly inclined chamber receives the turbulent current of the water collection tank, the horizontal chamber is used for horizontally placing the rectifying grid, and the upwardly inclined chamber transmits the rectified smooth current to the tank.

Further, a first acute angle a1 formed by an inclined wall of the downwardly inclined chamber and a lower side wall of the water collection tank and a second acute angle a2 formed by an inclined wall of the upwardly inclined chamber and the bottom wall of the tank satisfy that: $20°<a1<40°$, and $20°<a2<40°$.

Further, the first acute angle is equal to the second acute angle.

Further, the computer comprises a storage unit, a calculation unit and a control unit;

the storage unit is configured for storing a test program, a wave generation signal preset according to test requirements and data information acquired in real time;

the calculation unit is configured for calculating an error between a coded signal of the wave generation motor acquired in real time and the preset wave generation signal, and transmitting the error to the control unit; and the control unit controls the water inlet motor and the wave generation motor to execute the corresponding instructions according to the preset program.

Beneficial Effects:

The present invention provides the tank wave-current generation system with the rear-mounted outlet. The rear-mounted outlet is arranged, which means that the water inlet device is connected with the end part of the tank unit and located at the rear end of the opposite wave pushing direction of the wave generator, and the rectifying device located below the tank is arranged, the rectifying device comprises the rectifying chamber and the built-in rectifying grid, one end of the rectifying chamber is communicated with the water collection tank, and the other end of the rectifying chamber is communicated with the bottom wall of the tank, the outlet in the bottom wall is located at the front end of the wave pushing direction of the wave generator, the current subjected to preliminary energy dissipation in the water collection tank is rectified into the smooth fluid through the rectifying grid and then enters the tank, so that the current pushed by the wave pushing plate arranged on the wave generator is the steady current meeting the test requirement; and the water inlet amount of the water inlet and the wave pushing speed of the wave pushing plate are intelligently controlled through the computer, so that not only the technical problem that the current needs to be stabilized through the long transition section after entering the tank due to the fact that the current is in a vortex shape in the case that the water inlet pipeline is mounted in front of the wave pushing plate is thoroughly solved, and the infinite length use principle of linear tank current generation is met, but also test requirements of current generation and wave generation are met.

BRIEF DESCRIPTION OF THE DRAWINGS

The drawings described herein are used for providing further understanding for the present application, and constitute a part of the present application. Exemplary embodiments of the present application and the descriptions thereof are used for explaining the present application, and do not constitute any inappropriate limitation to the present application.

In the Drawings.

In the drawings.

Figure 1:
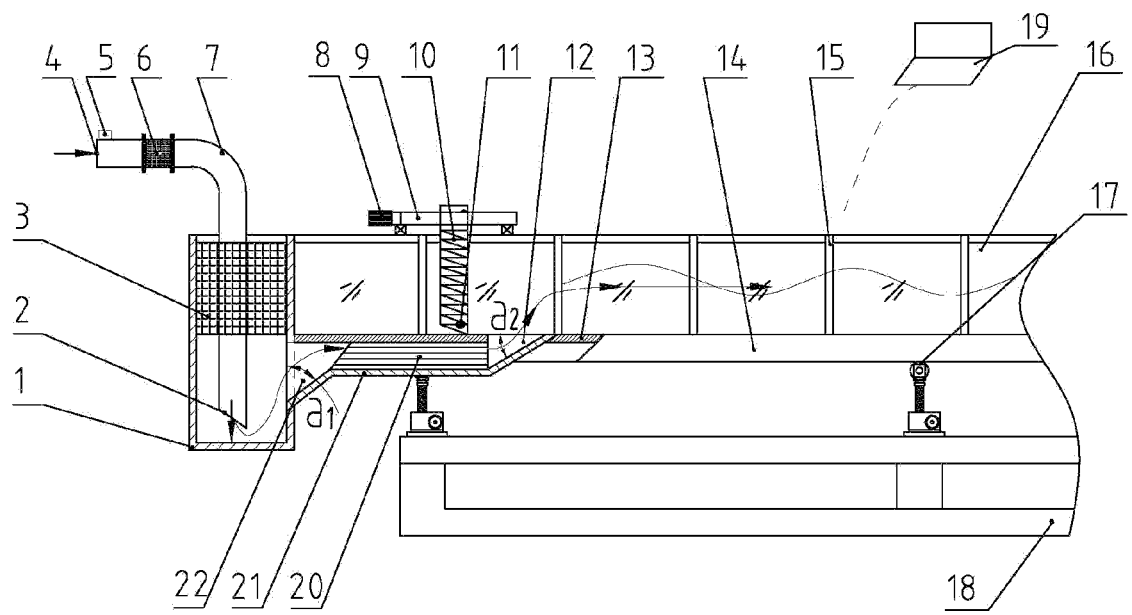
FIG. 1 is a schematic structural diagram of the technical solution of the present invention.

1 refers to water collection tank; 2 refers to outlet; 3 refers to energy dissipation net; 4 refers to water inlet; 5 refers to water inlet motor; 6 refers to flow meter; 7 refers to water inlet pipe; 8 refers to wave generation motor; 9 refers to wave generator; 10 refers to wave pushing plate; 11 refers to displacement sensor; 12 refers to upwardly inclined chamber; 13 refers to bottom wall of tank; 14 refers to bottom beam of tank; 15 refers to supporting frame; 16 refers to tank; 17 refers to slope changing lifter; 18 refers to tank base; 19 refers to computer; 20 refers to rectifying grid; 21 refers to rectifying chamber; 22 refers to downwardly inclined chamber; 23 refers to horizontal chamber; 24 refers to outlet in bottom wall; and 25 refers to load-bearing beam.

DETAILED DESCRIPTION

If some terms are used to refer to specific components in the specification and the claims, those skilled in the art should understand that hardware manufacturers may refer to the same component by different terms. In the specification and the claims, the components are distinguished by the difference of functions of the components instead of the difference of names. For example, the term "comprising" mentioned throughout the specification and the claims is an open term, and should be interpreted as "comprising but being not limited to". The term "several" refers to being more than three; and the following descriptions are the preferred implementations for implementing the present application, but the descriptions are for the purpose of explaining the general principles of the present application, and are not intended to limit the scope of the present application. The scope of protection of the present application should be subject to the scope defined by the appended claims.

In the preferred embodiments of the present invention, with reference to FIG. 1 to FIG. 4:

A tank wave-current generation system with a rear-mounted outlet comprises a tank device, a wave generation device, a water inlet device, a rectifying device, a driving motor and a computer.

The tank device comprises a tank 16 and supporting frames 15 for supporting the tank 16, a tank base 18 playing a role of foundation is arranged at a lower part of the tank 16, and a bottom part of a slope changing lifter 17 is fixedly mounted on the tank base 18, and the other end of the slope changing lifter is connected with a bottom beam 14 of the tank.

A plurality of supporting frames 15 are provided, which are uniformly arranged around the tank 16 along a current direction, and a wall of the tank between adjacent supporting frames 15 is a transparent wall made of a glass material, which is convenient for test observation.

A wave generator 9 stretches across a proximal end part of the tank 16 through a load-bearing beam 25, and is fixedly mounted on a side wall through a fastener (not shown in the drawings). The wave generator 9 comprises a wave generation motor 8, a wave pushing plate 10 vertically located in the tank 16 for moving to generate a wave and a displacement sensor 11 fixedly mounted on the wave pushing plate 10 to sense a displacement change. The displacement sensor 11 and the wave generation motor 8 are both connected with the computer 19.

Figure 2:
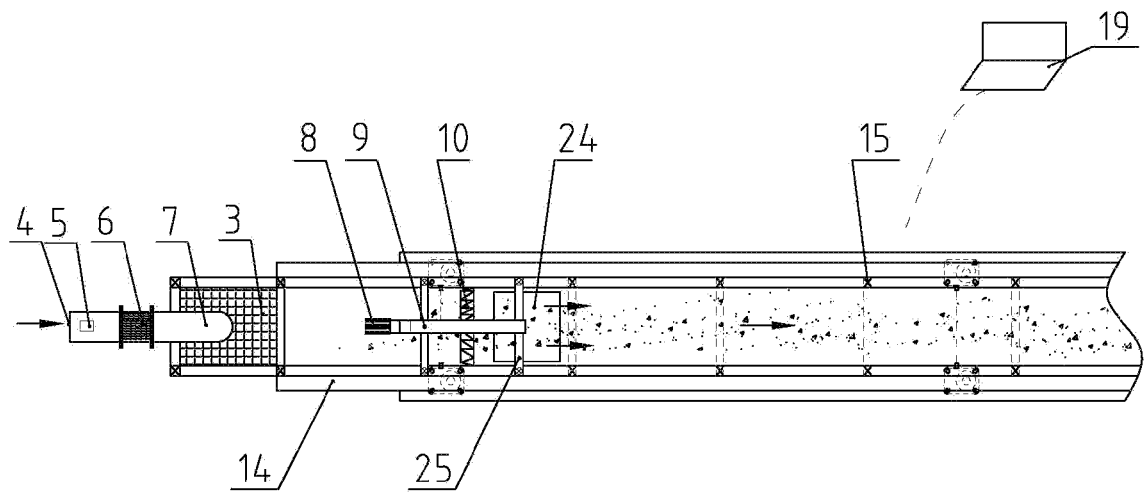
FIG. 2 is a top view of FIG. 1.

With reference to FIG. 1 and FIG. 2, taking the wave pushing plate 10 as a boundary, a left side of the wave pushing plate 10 is usually called a rear area of the wave generator 9, and a right side of the wave pushing plate is usually called a front area of the wave generator 9. During wave generation, the wave pushing plate 10 moves back and forth, a wave generated in the front area is an effective wave, and a wave generated in the rear area is an ineffective wave, which needs to be dissipated through the energy dissipation net.

First, the computer 19 generates a wave generation signal file through wave generation software and parameters such as water depth, wave height, period and spectrum energy of a corresponding test spectrum shape, and stores the wave generation signal file in a storage unit. At the beginning of wave generation, the computer 19 sets a phase relationship matched with a preset waveform, and controls the wave generation motor 8 to drive the wave pushing plate 10 to move for wave generation through a control unit. After the computer 19 collects position information of the wave pushing plate 10 transmitted by the displacement sensor 11 in real time and determines a zero position of the wave pushing plate 10, by comparing a collected coded signal of the wave generation motor 8 with preset data of the wave generation signal file, a calculation unit obtains error data, and then the control unit controls a rotation speed of the wave generation motor 8, so as to drive a linear motion speed of a screw (not shown in the drawings), and then push the wave pushing plate 10 to move through the screw. With forward and backward motion of the wave pushing plate 10, continuous effective waves are generated in the front area of the wave generator 9, and meanwhile, the wave pushing plate 10 also generates waves in the rear area of the wave generator 9, wherein the waves are ineffective waves, and dissipated through the energy dissipation net 3 mounted at an upper half part of the water collection tank 1. Since a height of the energy dissipation net 3 is equal to that of the side wall of the tank, the energy dissipation net can play a good role in wave dissipation.

The water inlet device is connected with an end part of the tank unit, and comprises a water inlet pipe 7 connected with a water inlet motor 5. An end of the water inlet pipe 7 provided with a water inlet 4 is fixedly provided with a flow meter 6 for transmitting flow information to the computer 19 in real time, and an end of the water inlet pipe provided with an outlet 2 extends to a position close to a bottom part of the water collection tank 1. The energy dissipation net 3 is mounted at the upper half part of the water collection tank 1, and the height of the energy dissipation net 3 is equal to that of the side wall of the tank, so that a water body flows out of the outlet 2 during current generation may generate a surge vertically and upwardly, and the energy dissipation net 3 also plays a role in wave dissipation.

The computer 19 collects an instantaneous flow value of the flow meter 6 in real time, and the calculation unit converts the instantaneous flow value into a flow speed value in the tank 16, which is used as feedback data, compared with a preset flow value required by a test and calculated to obtain a difference value. The control unit controls the water inlet motor 5 to adjust a water inlet amount of the water inlet 4 in real time according to the difference value. When the flow value keeps stable and smooth for more than 15 minutes, the computer 19 controls synchronous beginning of current generation and wave generation. During current generation, the water amount of the water inlet 4 is changed synchronously according to a flow tide level curve change. During wave generation, a motion speed of the wave pushing plate 10 is controlled to meet a preset test requirement.

The rectifying device is located below the tank 16, and comprises a rectifying chamber 21 and a rectifying grid 20 horizontally placed in the chamber.

Figure 3:
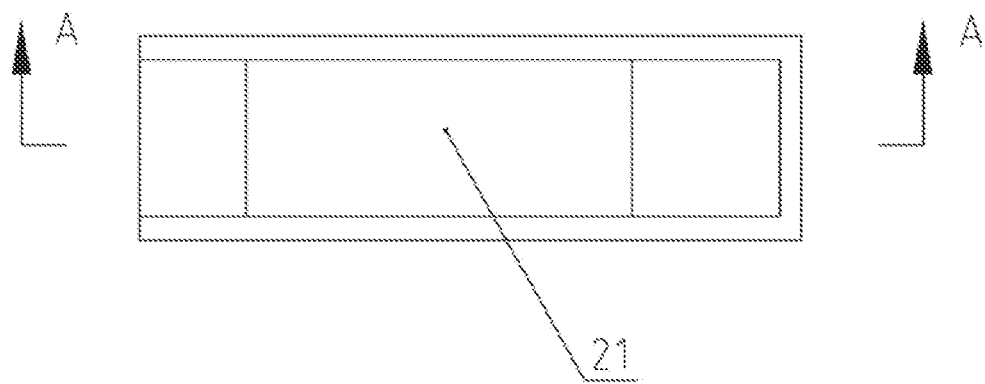
FIG. 3 is a schematic structural diagram of a rectifying chamber.
Figure 4:
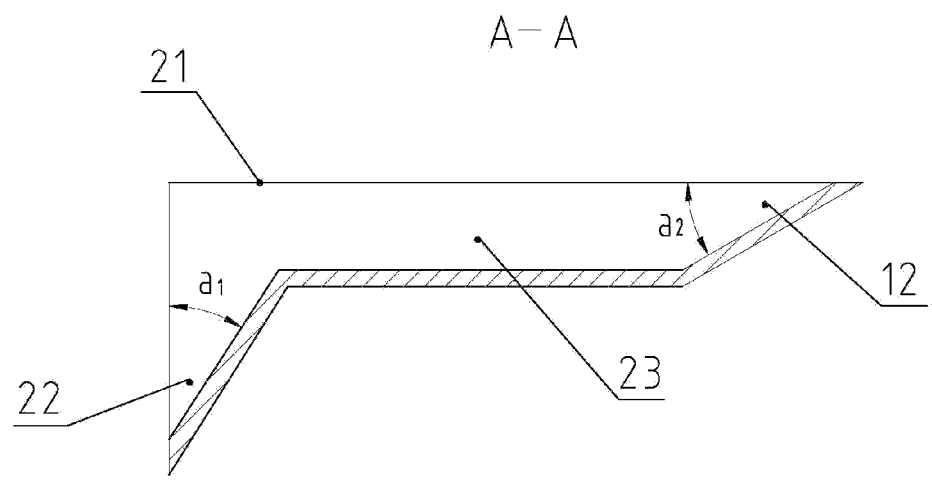
FIG. 4 is a cross-sectional view of A-A in FIG. 3.

With reference to FIG. 3 and FIG. 4, the rectifying chamber 21 comprises an upwardly inclined chamber 12, a horizontal chamber 23 and a downwardly inclined chamber 22. The downwardly inclined chamber 22 is communicated with the water collection tank 1 through a lower side wall, the upwardly inclined chamber 12 is connected with the bottom wall 13 of the tank, and communicated with the tank 16 through an outlet 24 in the bottom wall 13 of the tank, and the rectifying grid 20 is placed in the horizontal chamber 23.

An acute angle formed by the downwardly inclined chamber 22 and the lower side wall of the water collection tank 1 is a1, an acute angle formed by the upwardly inclined chamber 12 and the bottom wall 13 of the tank is a2, and a1 and a2 should both range from 20° to 40°.

In some embodiments, a1 and a2 are different.

In some embodiments, a1 and a2 are the same.

Preferably, the acute angle is 30°.

The water body flows in from the water inlet 4 of the water inlet pipe 7, and flows out from the outlet 2 extending to the position close to the bottom part of the water collection tank 1. The outlet 2 is an inclined opening, and the dynamic inertial energy water body may be jetted out from the outlet 2 to spread to a rear and lower area of the water collection tank 1, so as to maintain the balance of the water collection tank 1, which means that the water body in the water collection tank 1 is turbulent. With continuous increase of the water amount, although the energy dissipation net may dissipate a part of surging energy during upward surging, the water body may not flow smoothly, enter the rectifying chamber 21 along the downwardly inclined chamber 22 to be rectified by the rectifying grid 20 in the horizontal chamber 23 to form a smooth current, and then flow into the tank 16 through the outlet 24 in the bottom wall of the upwardly inclined chamber 12.

In some embodiments, the outlet 2 is a flat opening.

The foregoing shows and describes the preferred embodiments of the present application. However, as described above, it should be understood that the present application is not limited to the forms disclosed herein, the preferred embodiments should not be regarded as excluding other embodiments, but can be used in various other combinations, modifications and environments, and can be changed by the above teachings or the technology or knowledge in related fields within the scope of concept of the present application described herein. Moreover, the modifications and changes made by those skilled in the art without departing from the spirit and scope of the present application should all fall within the scope of protection of the appended claims of the present application.

The invention claimed is:

1. A tank wave-current generation system with a rear-mounted outlet, comprising a tank device which comprises a tank unit for bearing a test water body; and a wave generation device which comprises a wave generator mounted at an end part of the tank unit to generate a wave according to a preset instruction; wherein: the system further comprises: a displacement sensor mounted on a wave pushing plate which is arranged on the wave generator; a water inlet device connected with the end part of the tank unit, wherein a water inlet is provided with a flow meter and a water inlet motor, used for synchronously controlling a water inlet amount flowing into the tank unit according to a preset flow tide level curve change instruction, and comprising a water collection tank provided with an energy dissipation unit, wherein a height of an energy dissipation net arranged in the energy dissipation unit is as high as a side wall of a tank arranged in the tank unit; a rectifying device comprising a rectifying chamber fixedly mounted at a bottom part of the tank, and comprising a downwardly inclined chamber, a horizontal chamber and an upwardly inclined chamber which are connected in sequence, wherein the downwardly inclined chamber is connected with a lower end of the water collection tank, the upwardly inclined chamber is connected with a bottom wall of the tank, a rectifying grid is horizontally arranged in the horizontal chamber, and the downwardly inclined chamber, the horizontal chamber and the upwardly inclined chamber are arranged in steps, so that a current subjected to preliminary energy dissipation by the water collection tank is rectified into a smooth fluid by the downwardly inclined chamber and the rectifying grid, then passes through the upwardly inclined chamber and then flows upwardly into the bottom part of the tank, and an inlet is located at a middle part of the bottom wall at a front end of a wave pushing direction of the wave generator; a driving device for driving the wave generator to execute corresponding actions respectively according to instructions, and comprising a wave generation motor; and a control device for controlling the driving device to execute the instructions according to a preset program and information obtained in real time, and comprising a computer.

2. The tank wave-current generation system with the rear-mounted outlet according to claim 1, wherein the tank unit comprises the tank and supporting frames uniformly arranged around the tank along a current direction with a supporting function, and a side wall of the tank between adjacent supporting frames is a transparent wall.

3. The tank wave-current generation system with the rear-mounted outlet according to claim 2, wherein the wave pushing plate is controlled by the wave generation motor for wave generation and the wave generation motor and the displacement sensor are both connected to the computer.

4. The tank wave-current generation system with the rear-mounted outlet according to claim 1, wherein the water inlet device further comprises a water inlet pipe connected with the water inlet motor, the flow meter for transmitting flow information to the computer in real time is mounted on the water inlet pipe, and the computer controls the water inlet motor in real time according to the preset program and the flow information.

5. The tank wave-current generation system with the rear-mounted outlet according to claim 4, wherein an outlet of the water inlet pipe extends to a position close to the bottom part of the water collection tank, the energy dissipation net arranged in the energy dissipation unit is mounted at an upper half part of the water collection tank, and the height of the energy dissipation net is equal to that of the side wall of the tank.

6. The tank wave-current generation system with the rear-mounted outlet according to claim 4, wherein:
the computer comprises a storage unit, a calculation unit and a control unit;
the storage unit is configured for storing a test program, a wave generation signal preset according to test requirements and data information acquired in real time;
the calculation unit is configured for calculating an error between a coded signal of the wave generation motor acquired in real time and the preset wave generation signal, and transmitting the error to the control unit; and
the control unit controls the water inlet motor and the wave generation motor to execute the corresponding instructions according to the preset program.

7. The tank wave-current generation system with the rear-mounted outlet according to claim 1, wherein: a first acute angle a1 formed by an inclined wall of the downwardly inclined chamber and a lower side wall of the water collection tank and a second acute angle a2 formed by an inclined wall of the upwardly inclined chamber and the bottom wall of the tank satisfy that: {200<a1<400, and 200<a2<400]] 20°<a1<40°, and 20°<a2<40°.

8. The tank wave-current generation system with the rear-mounted outlet according to claim 7, wherein: the first acute angle a1 is equal to the second acute angle a2.

* * * * *